J. R. CLARK.
HOE.
APPLICATION FILED JUNE 26, 1919.

1,387,883.

Patented Aug. 16, 1921.

Inventor
J. R. Clark.
By Franklin N. Hoyt
Attorneys

UNITED STATES PATENT OFFICE.

JAMES ROBT. CLARK, OF SADLER, TEXAS.

HOE.

1,387,883.  Specification of Letters Patent.  Patented Aug. 16, 1921.

Application filed June 26, 1919. Serial No. 306,838.

*To all whom it may concern:*

Be it known that I, JAMES R. CLARK, a citizen of the United States, residing at Sadler, in the county of Grayson and State of Texas, have invented certain new and useful Improvements in Hoes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in hoes, and consists essentially in the provision of a tool of this nature having a colter shank at the oval top, affording means whereby the hoe may clear itself from large branching weeds, which is frequently a trouble met with in using hoes having a shank in the center.

The invention comprises various other details of construction, combination and arrangement of parts which will be hereinafter fully described, shown in the accompanying drawings and then specifically defined in the appended claim.

My invention is illustrated in the accompanying drawings which with the letters of reference marked thereon, form a part of this application and in which.

Figure 1:
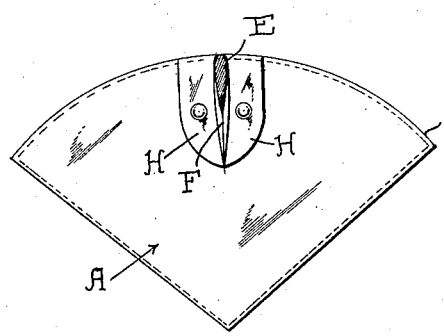
Figure 1 is a face view from the handle side of the hoe.
Figure 2:
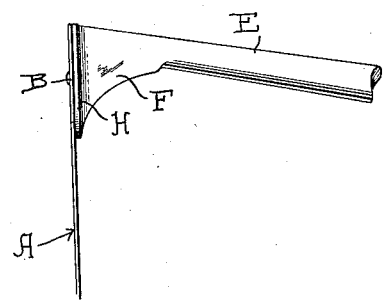
Fig. 2 is a side elevation.
Figure 3:
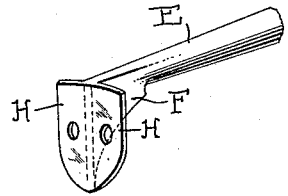
Fig. 3 is a perspective view of the handle end detached.

Reference now being had to the details of the drawings by letter:

A designates a hoe of triangular shape with a convexed rear edge B. The handle E has a colter part F near the inner end and which has laterally extending flanges H which are riveted, or otherwise fastened, to the face of the hoe, as shown. The outer edge of said handle is flush with the convexed edge of the hoe, and the colter is so positioned that it will tend to clear itself from large branching weeds when in use, making a tool especially adapted for heavy duty farm work.

What I claim to be new is:

In a hoe, a handle socket provided with a narrowed portion and a depending portion sharpened at its lower edge and terminating in a blade attaching flange, the narrowed portion being between the flange and the closed end of the socket, and a blade attached to the flanged portion co-planar with the top of the narrowed portion.

In testimony whereof I hereunto affix my signature.

JAMES ROBT. CLARK.